(12) United States Patent
Thibault et al.

(10) Patent No.: US 7,856,802 B2
(45) Date of Patent: Dec. 28, 2010

(54) COMBINED GOLF BALL RETRIEVER AND RETRACTABLE SAND RAKE

(75) Inventors: Daniel Thibault, Montreal (CA); Gilles Fortier, Montréal (CA)

(73) Assignee: GF Developpement, Laval, Québec (CA)

( * ) Notice: Subject to any disclaimer, the term of this patent is extended or adjusted under 35 U.S.C. 154(b) by 0 days.

(21) Appl. No.: 12/621,876

(22) Filed: Nov. 19, 2009

(65) Prior Publication Data

US 2010/0127521 A1    May 27, 2010

Related U.S. Application Data

(60) Provisional application No. 61/116,680, filed on Nov. 21, 2008.

(51) Int. Cl.
    *A01D 7/00*    (2006.01)

(52) U.S. Cl. .................................................. 56/400.04
(58) Field of Classification Search . 56/400.01–400.19; 172/371, 378; 294/19.1, 19.2, 54.4–56.2; 473/286

See application file for complete search history.

(56) References Cited

U.S. PATENT DOCUMENTS

| | | | | | |
|---|---|---|---|---|---|
| 3,390,516 | A | * | 7/1968 | Burrows | 56/400.19 |
| 4,236,742 | A | * | 12/1980 | Florence | 294/24 |
| 5,080,413 | A | * | 1/1992 | Vobeda | 294/19.2 |
| 5,423,584 | A | * | 6/1995 | Pasternak | 294/19.2 |
| 5,921,598 | A | * | 7/1999 | Bredow | 294/19.2 |
| 6,454,331 | B1 | * | 9/2002 | Ahlenius | 294/19.2 |
| 6,695,370 | B2 | * | 2/2004 | Johnson | 294/19.2 |
| 6,951,095 | B2 | * | 10/2005 | Cusato | 56/400.04 |

* cited by examiner

*Primary Examiner*—Robert E Pezzuto
(74) *Attorney, Agent, or Firm*—Ogilvy Renault LLP

(57) ABSTRACT

A golf ball retriever having a retractable sand rake integrated at one end thereof wherein the rake assembly is unfold from a collapsed position to an extended position.

18 Claims, 15 Drawing Sheets

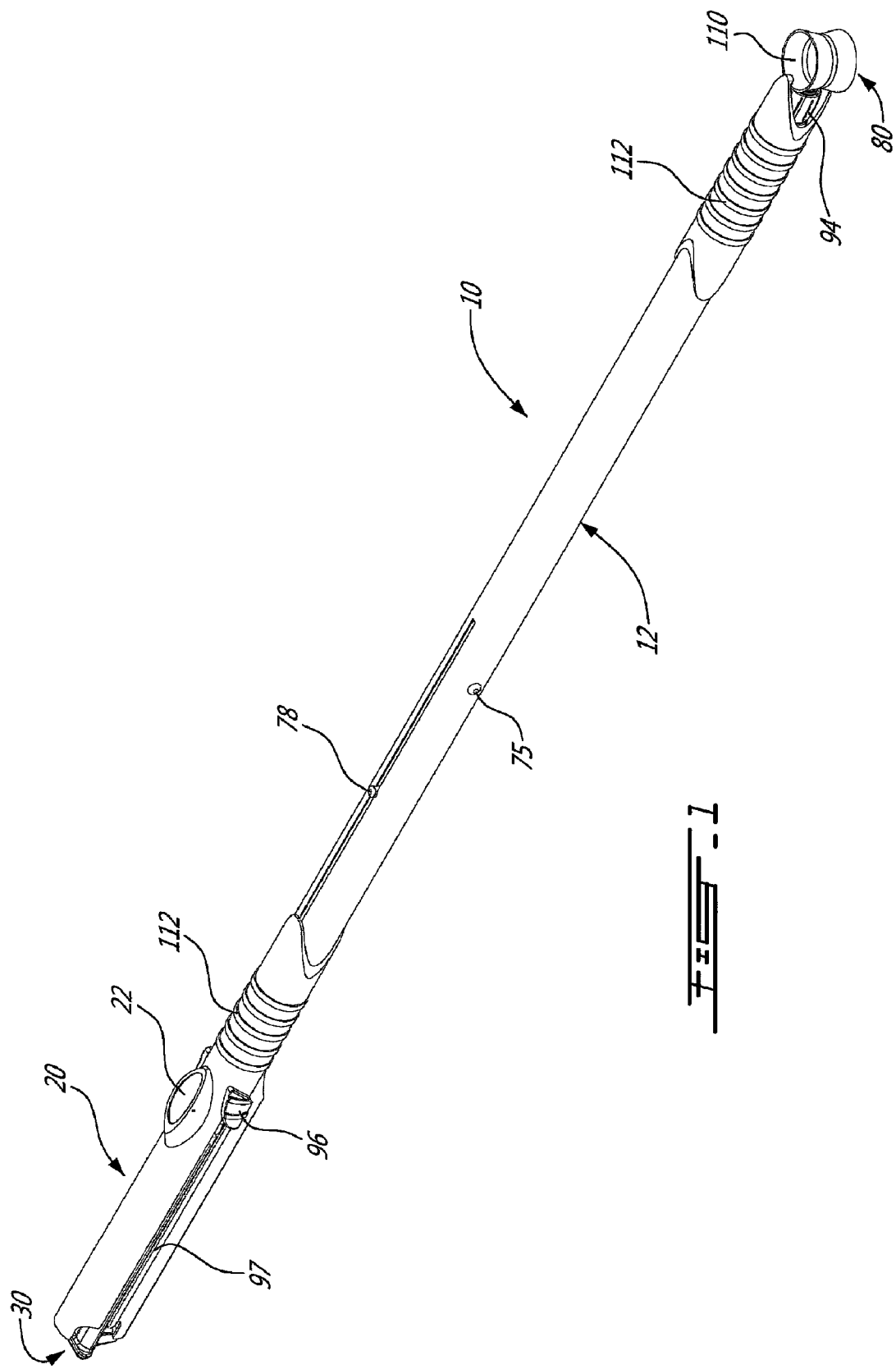

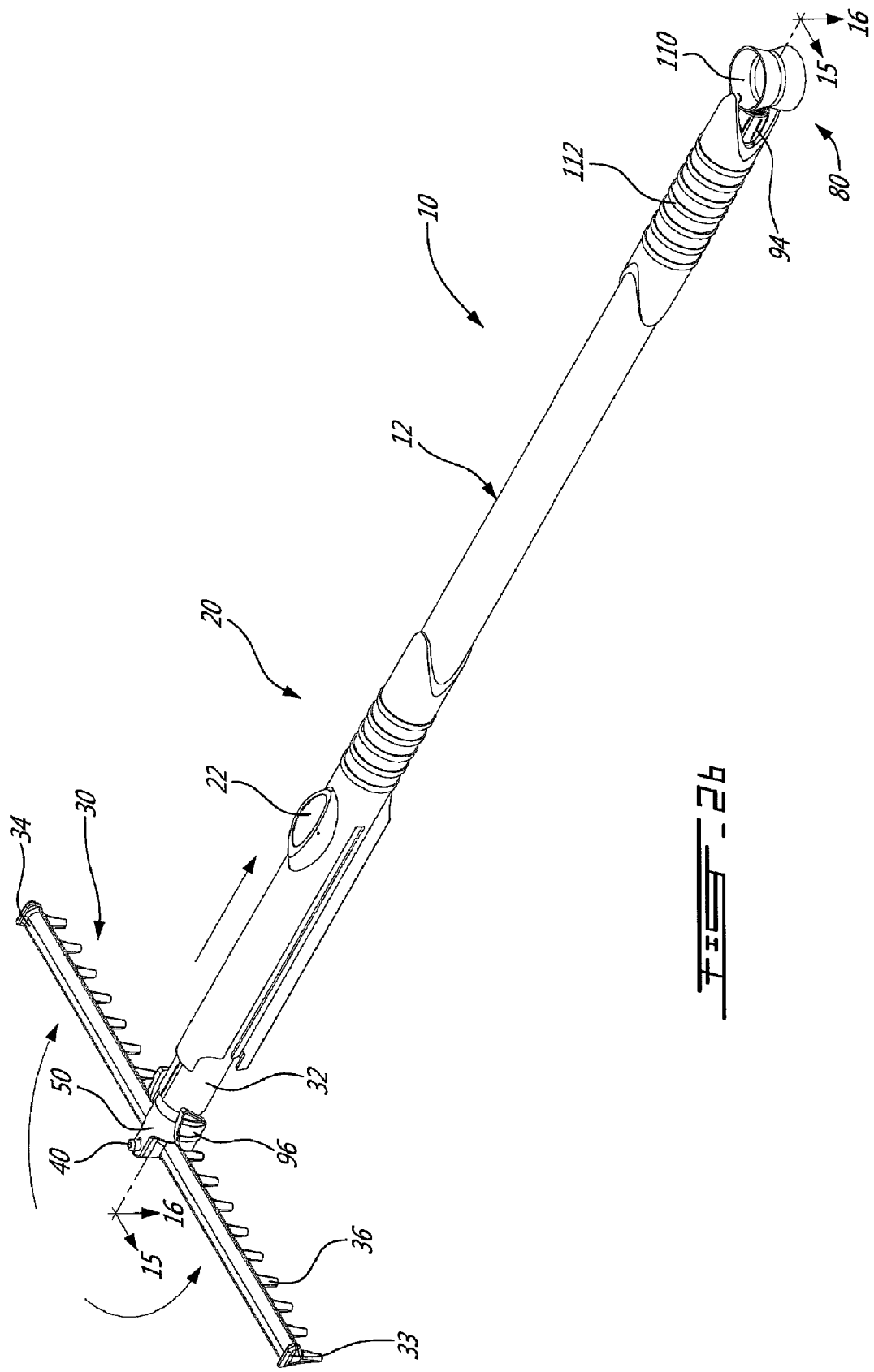

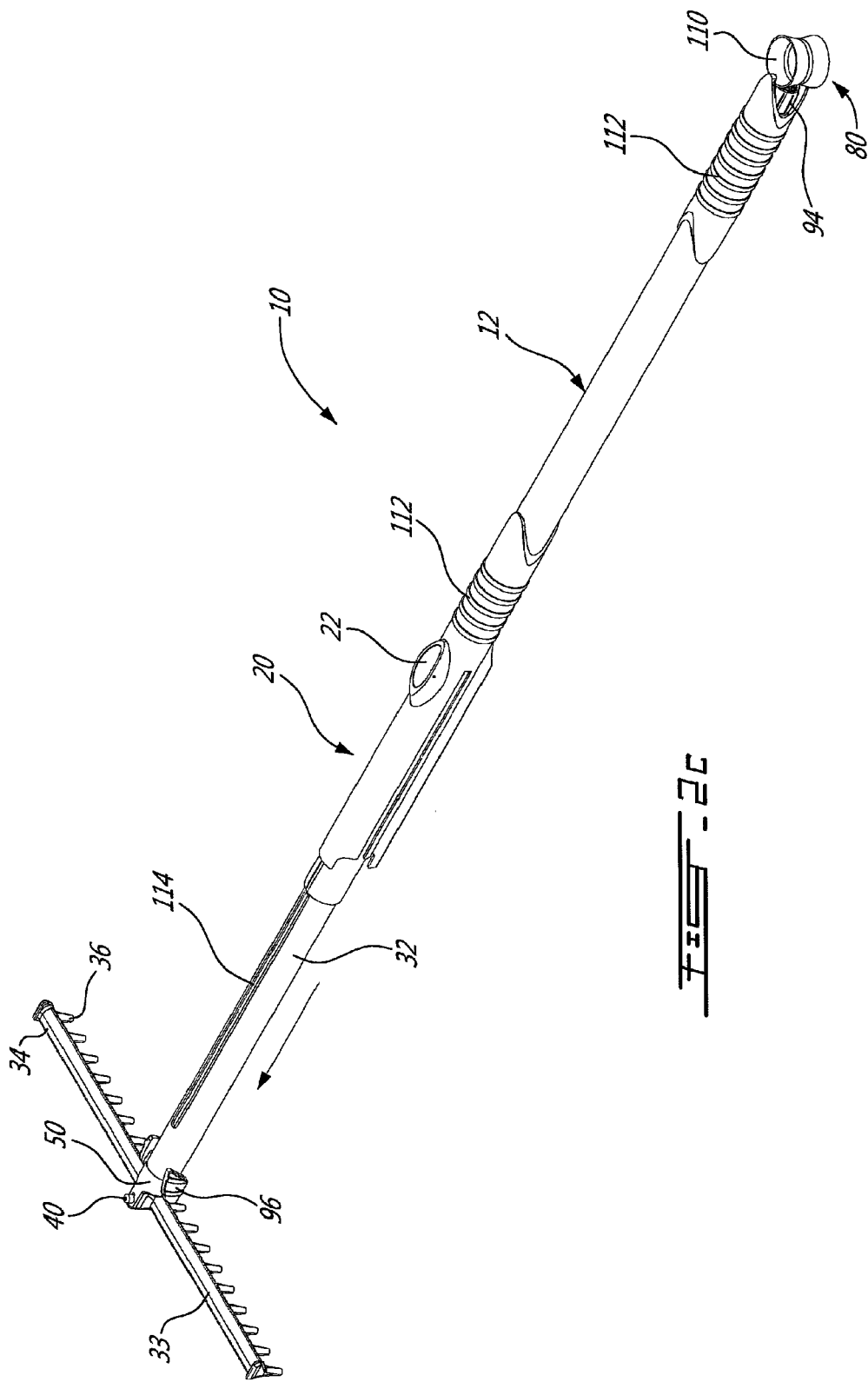

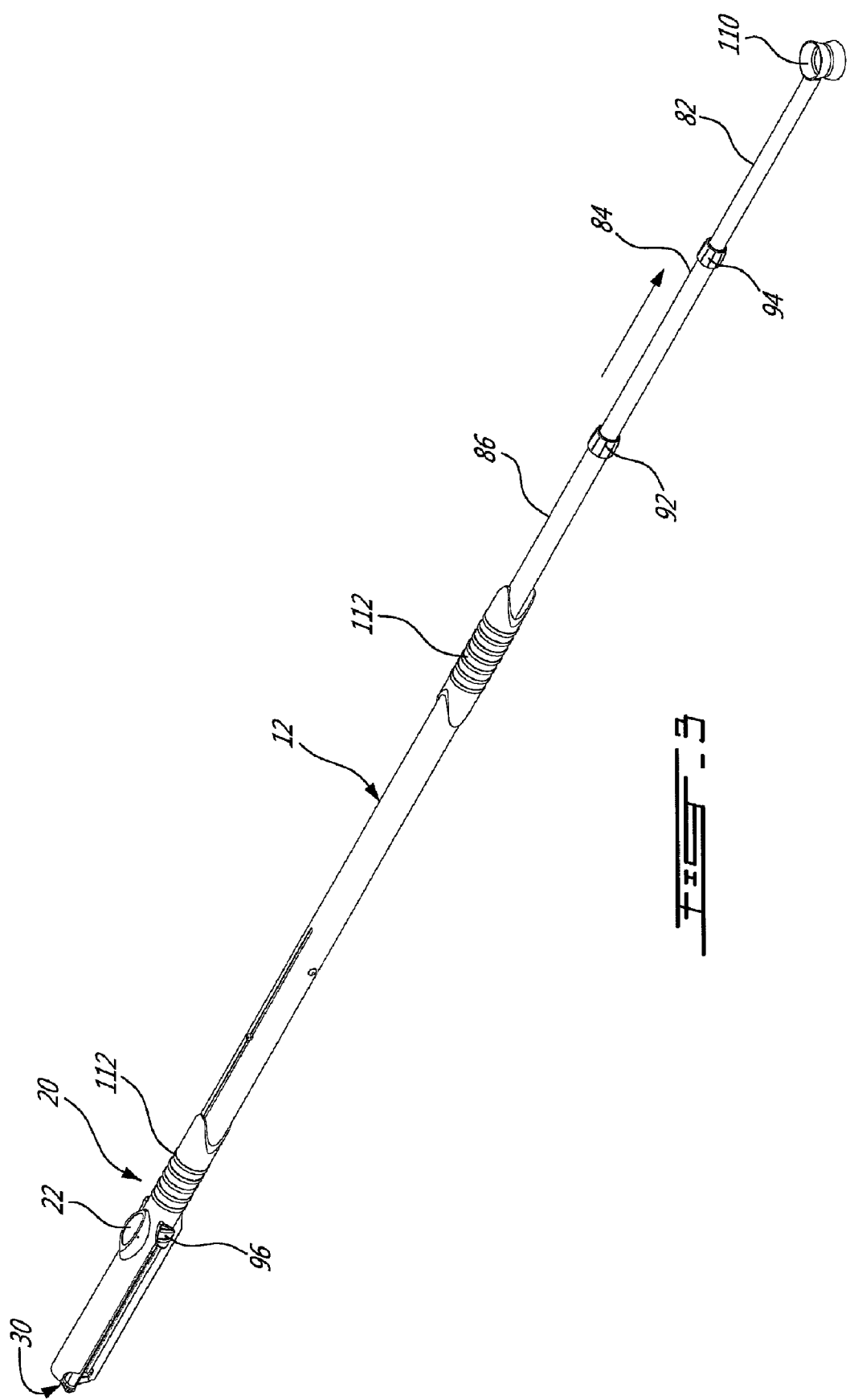

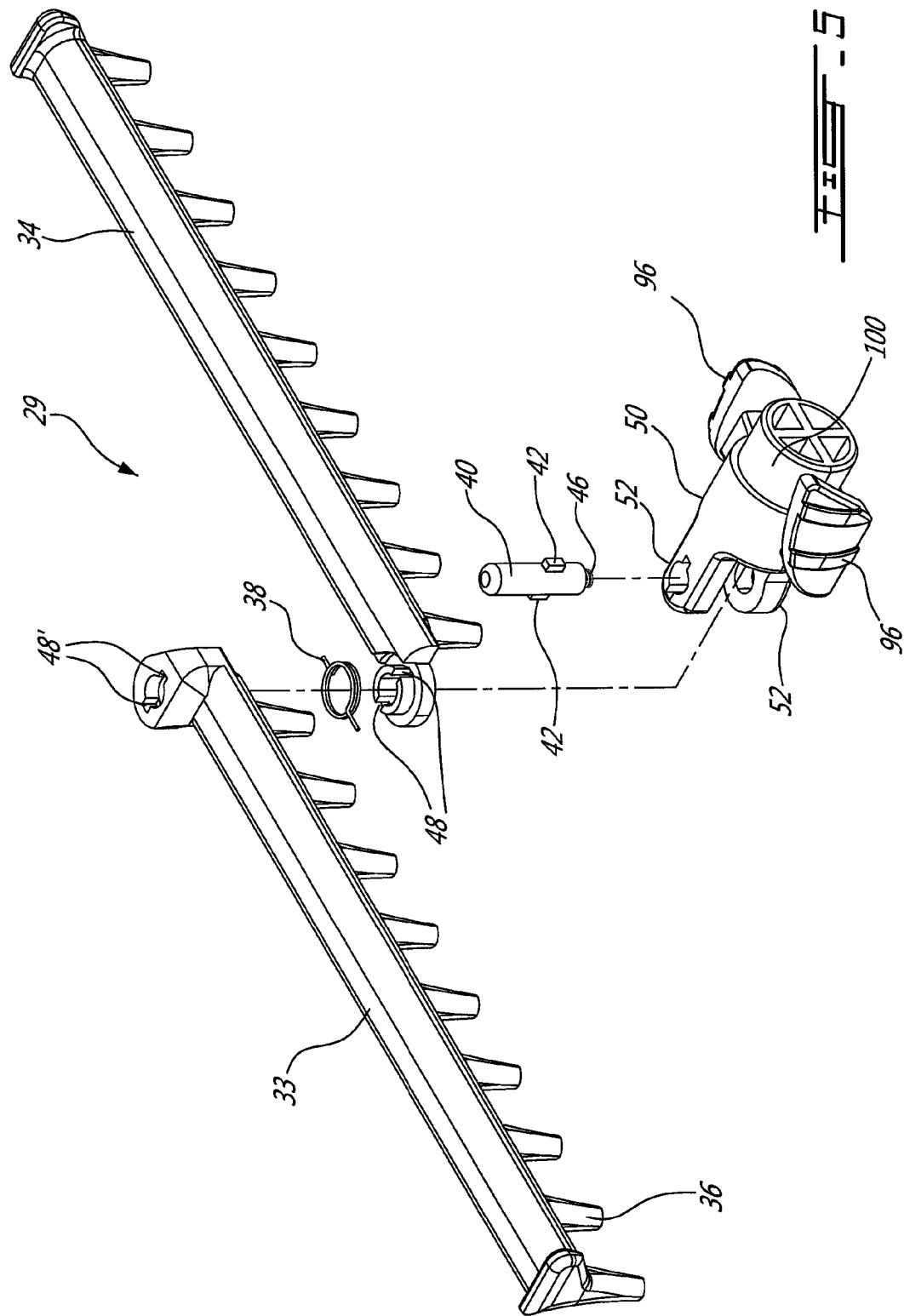

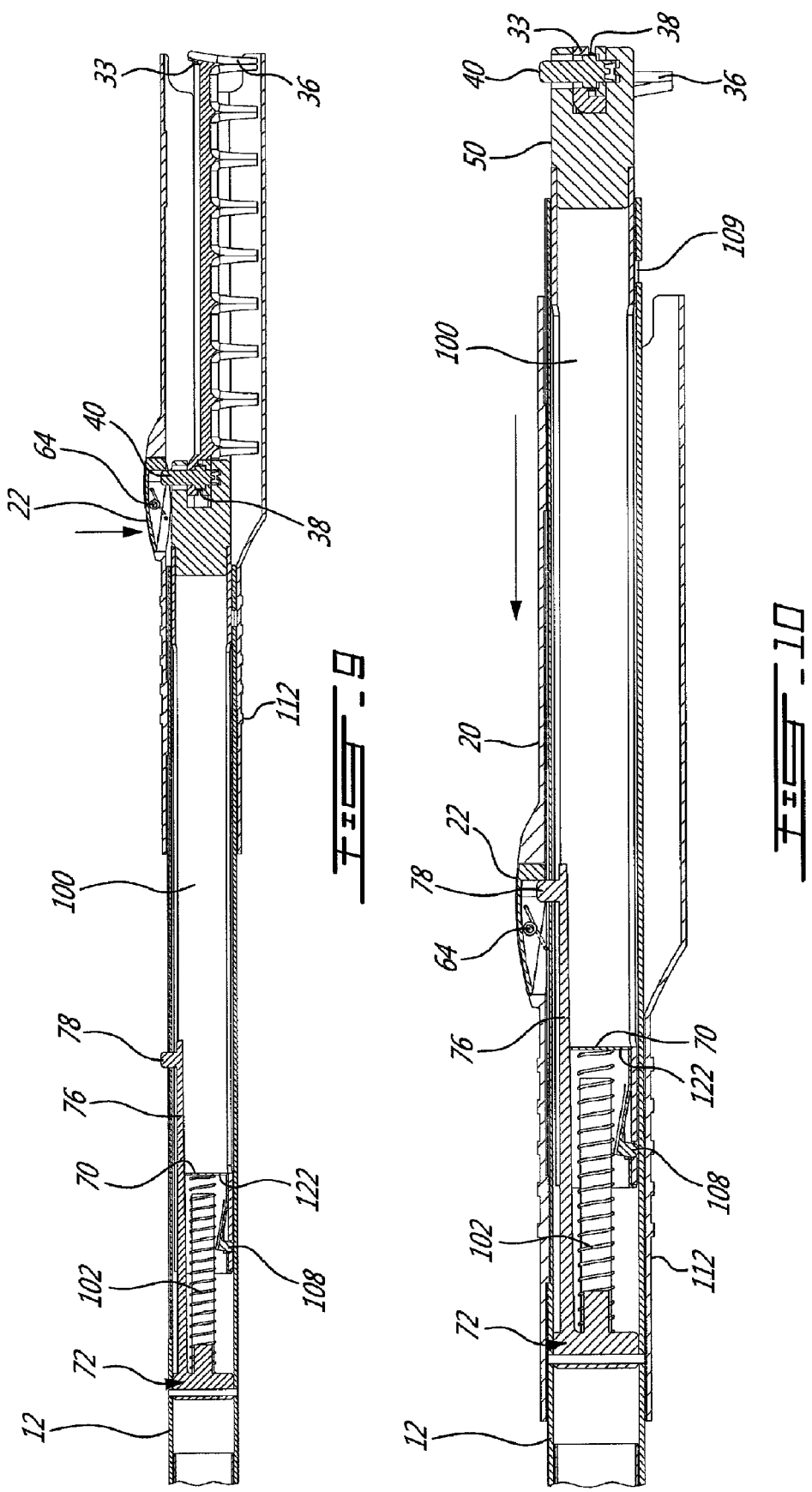

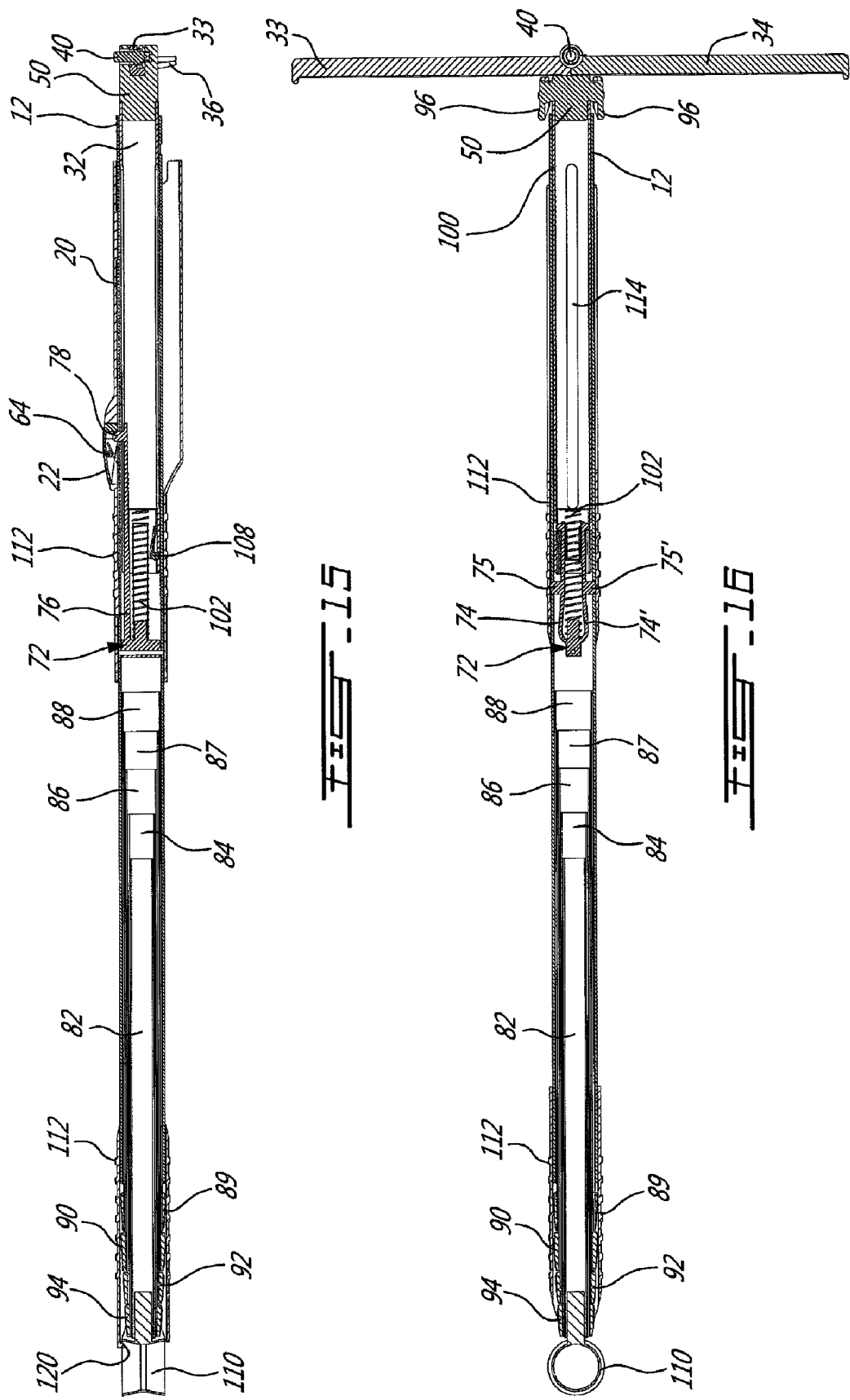

COMBINED GOLF BALL RETRIEVER AND RETRACTABLE SAND RAKE

RELATED APPLICATION

The present application claims priority on U.S. provisional patent application No. 61/116,680 filed on Nov. 21, 2008.

TECHNICAL FIELD

The present disclosure relates to golf ball retrievers and more particularly to a golf ball retriever having a retractable sand rake integrated at one end thereof.

BACKGROUND ART

One of the hazards encountered on a golf course is the bunker or sand trap. Once a ball enters a bunker and the player has hit the ball out, golf etiquette calls for the player to fill and smooth over his footprints and depressions left in the sand after he has hit a golf ball out of the bunker. The necessary restoration of the bunker surface is generally carried out with a bunker rake which is left alongside each bunker.

Such bunker rakes have added to the cost of golf course operation in order to ensure that sufficient number of rakes is available around the bunkers. In addition, esthetically, golf rakes lying around the bunkers diminish the visual aspect of the golf course. Further, many golfers often find the golf rakes provided by the golf course to be an unwanted obstacle to play, and when needed, in an inconvenient location. Rakes lying around bunkers add to the risk of a golf ball hitting the rakes during play which can penalize the golfer by perturbing the trajectory of the ball.

Furthermore, in addition to the fact that the cheaply constructed bunker rakes have a tendency of breaking and thus have a very limited useful life, golfers tend to take such rakes away from the bunkers in order to retrieve golf balls from waterways and like inaccessible locations.

Accordingly, there has been a need for a novel sand rake assembly which overcomes the drawbacks of prior devices available to date.

SUMMARY

In accordance with the present disclosure, there is provided a combined golf ball retriever and retractable rake tool comprising a tubular body having a first end and a second end; a rake assembly comprising a pair of pivotally interconnected rake arms pivotable between a retracted position in which the rake arms are folded once against the other at least partly concealed inside the first end of the tubular body, and an extended position in which the first and second arms are disposed in general linear alignment outside of the first end; and a ball retriever assembly having at least one telescoping member displaceable from a retracted position in which the telescoping member is at least partly retracted in the second end of the tubular body, and an extended position in which the telescoping member project outwardly from the second end of the tubular body.

In an embodiment, the tubular body comprises a main tube and a tubular control handle axially slidable between operational positions along the main tube for retracting and deploying the rake assembly.

The tubular control can be movable from a first position in which the tubular control handle extends at least partly over the rake arms when the rake arms assume the retracted position thereof to a second position in which the rake arms are exposed.

In an alternate embodiment, the pair of rake arms are pivotally interconnected by a spring-loaded axle having a locking protrusion for engagement with corresponding abutment structure on the rake arms, and wherein the tubular control handle in the first position thereof push the spring-loaded axle against a biasing force thereof, thereby holding the locking protrusion in an inoperable position to permit deployment of the rake arms upon movement of the control handle towards their second position, wherein after deployment, the locking protrusion cooperates with the abutment structure to block relative pivotal movement of the rake arms.

The rake assembly can comprise an extension tube retractable in the tubular body, the rake arms being mounted at a distal end portion of the extension tube, the extension tube being displaced to an extended position when the control handle assumes its second position.

In another embodiment, the combined golf ball retriever and retractable rake tool comprises a launching mechanism housed in the main tube, the control handle triggering the launching mechanism when displaced to the second position thereof to cause the extension tube to extend from the first end of the main tube.

In another embodiment, the rake assembly further comprises a head member connected at a proximal end to an extension tube, the head member having at an opposed distal end thereof a pair of axially extending spaced-apart fingers adapted to receive therebetween the spring-loaded axle.

The combined golf ball retriever and retractable rake tool can also further comprise a launching mechanism housed in the main tube, the control handle triggering the launching mechanism when displaced to the second position thereof to cause the extension tube to extend from the first end of the main tube.

The launching mechanism can comprise a bracket comprising a pair of spring-loaded arms being releasably connected to the main tube, each spring-loaded arms comprising a locking finger for engagement in a corresponding slot in the extension tube, and an elongated arm with a latching pin projecting through an elongated slot defined in the surface of the main tube, the latching pin releasably latching the control handle in the retracted position.

In another embodiment, the combined golf ball retriever and retractable rake tool can also further comprises a cap fixedly mounted on a proximal end of an extension tube, the cap comprising a locking finger spring loaded against the main tube and falling in a catch defined at the main tube when the extension tube reaches its extended position.

The extension tube can comprise at least one elongated longitudinal slot allowing dust particles to fall out of the tool.

In another embodiment, the at least one telescoping member comprises at least one concentric tube concentrically mounted to the tubular body with at least one locking ring selectively locking the concentric tube in position relative to the tubular body when tightened.

The tubular body can also comprise a handle at the second end of the tubular body, the handle having a hook for engaging the ball retriever when in the retracted position.

Also in accordance with the present disclosure, there is provided combined golf ball retriever and retractable rake comprising a main tube having a first end and a second end; a rake assembly provided at the first end of the tubular body, the rake assembly comprising two rake arms pivotally connected to a distal end portion of an extension tube at least partly retractable inside the main tube, the rake arms being pivotable from a collapsed position to an extended position; a ball retriever assembly provided at the second end of the tubular body, the ball retriever having at least one telescoping rod retractable in the second end of the tubular body and axially extendable therefrom; a control handle axially slidable on the main tube, the control handle when displaced to a first position enabling the rake assembly to unfold from the collapsed position to the extended position by uncovering the rake assembly; and a launching mechanism housed in the main tube, the control handle triggering the launching mechanism when displaced to the first position thereof to cause the extension tube to extend from the first end of the main tube.

BRIEF DESCRIPTION OF THE DRAWINGS

Reference will now be made to the accompanying drawings in which:

FIG. 1 is a perspective view of a dual function tool having a ball golf retriever integrated at a first end thereof and a retractable sand rake at a second opposed end thereof, the combined article being shown in a retracted or collapsed state;

FIG. 2b is a perspective view of the combined golf ball retriever and sand rake tool showing the pivotal arms of sand rake portion in a fully deployed state;

FIG. 2c is a perspective view of the combined golf ball retriever and sand rake tool with the extension tube of the sand rake portion of the tool in a fully extended state;

FIG. 3 is a perspective view of the combined golf ball retriever and sand rake tool with the telescopic golf ball retriever portion of the tool shown in a fully extended position;

FIG. 5 is an enlarged exploded perspective view of the sand rake components of the tool;

FIG. 6 is an enlarged exploded perspective view of the pivotal details of the sand rake assembly shown in FIG. 5;

FIG. 9 is a side cross-section of the overall sand rake portion of the tool, illustrating the internal mechanism used to selectively push the rake extension tube out of the main tube of the tool;

FIG. 10 is a side cross-section of the sand rake portion with the hollow control handle shown in a retracted position uncovering the deployable arms of the rake and triggering the mechanism used to push the rake extension towards the extended position thereof;

FIGS. 15 and 16 are respectively side and top cross-sections of the combined golf ball retriever and sand rake tool, illustrating the golf ball retriever portion in a retracted position within the main tube of the tool and the sand rake portion in a partly deployed position.

It will be noted that throughout the appended drawings, like features are identified by like reference numerals.

DETAILED DESCRIPTION

Figure 2A:
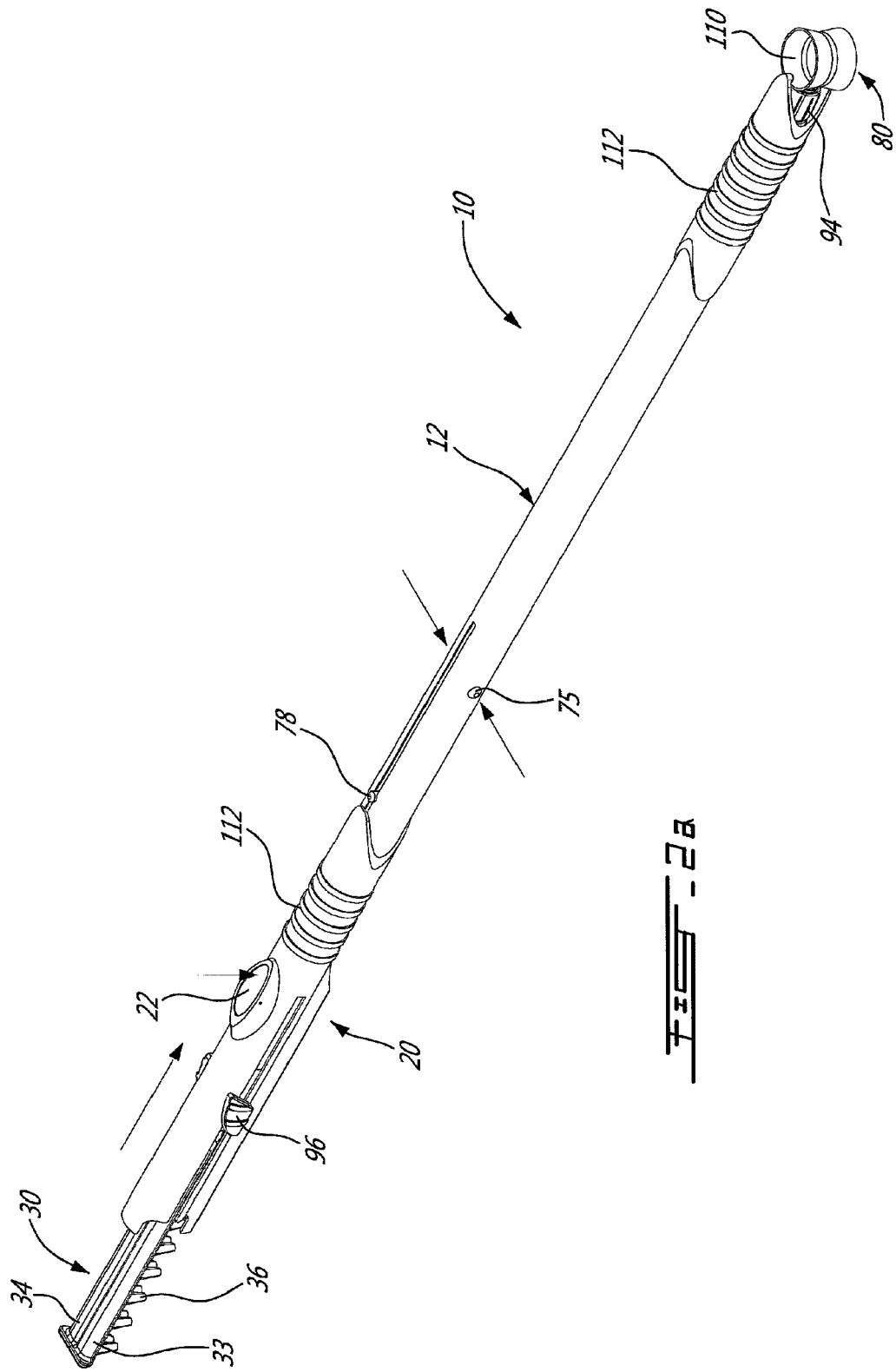
FIG. 2a is perspective view of the combined golf ball retriever and sand rake tool, illustrating the sand rake portion of the tool in the process of being deployed.

It is disclosed herein a combined golf ball retriever and retractable rake tool comprising a tubular body wherein a rake assembly can be retracted therein at one end and a ball retriever assembly can be retracted at the opposite end of the tubular body. As illustrated in an embodiment, the tubular body can comprise a main tube and a tubular control handle. A person skilled in the art would acknowledge that any other tubular structure adapted to receive a rake assembly at one end and a ball retriever assembly at the opposite end can be used and is contemplated herein.

As will be seen hereinafter, FIG. 1 illustrates an embodiment of the combined golf ball retriever and sand rake tool 10 in which the sand rake can be retracted and concealed in the hollow handle shaft of the tool to enable the use of the tool just as a conventional golf ball retriever when the sand rake is retracted to its storage position, and which is of compact construction such as to be easily transportable in a golf bag.

More particularly, FIG. 1 illustrates a combined golf ball retriever and sand rake tool 10. The tool 10 generally comprises a main tube or tubular post 12 having at a first end thereof a retractable rake assembly 30 and at the opposite end thereof golf ball retriever assembly 80. This configuration provides for a compact tool construction. A control sleeve or tubular handle 20 is slidably mounted on the main tube 12 to selectively expose and expand the rake assembly 30, thus slidable between operational positions along the main tube 12. As shown in FIGS. 2 and 5, the rake assembly 30 generally comprises a foldable head portion 29 carried at a distal end of a rake extension tube 32 slidably received in the main tube 12.

As will be seen hereinafter, the rake assembly 30 can be easily deployed in an extended position (FIG. 2c) by merely axially sliding the hollow control handle 20 along the main tube 12 towards an intermediate position thereon (see FIGS. 2a, 2b and 2c). As shown in FIG. 1, the handle 20 substantially covers the rake assembly 30 when the same is in its retracted or storage state. As shown in FIG. 2a, the user has simply to press with his/her thumb on a button 22 provided on the handle 20 to thereby unlatched the handle 20 from the main tube 12 and then slide the handle 20 on the main tube 12 towards the golf ball retriever assembly 80 in order to first expose the foldable head portion 29 of the rake assembly 30 and then trigger the mechanism that will release and push the rake extension tube 32 out of the main tube 12, as shown in FIG. 2c. Anti-rotational mechanisms are also contemplated between handle 20 and main tube 12. For instance, the handle 20 could have an oval shape in cross-section.

As shown in FIG. 3, the tool 10 can also be used as a conventional golf ball retriever. The golf ball retriever assembly 80 can be deployed by extending a number of telescoping tubular segments or members (five in the illustrated embodiment, see FIGS. 15 and 16) received in a telescoping fashion within one end of the main tube 12 opposite the rake assembly 30. More particularly, as shown in FIGS. 3, 15 and 16, the ball retriever assembly 80 may comprise a plurality of concentric tubes 82, 84, 86, 87 and 88 with locking rings 89, 90, 92 and 94 between each pair of adjacent tubes to selectively permit or prevent relative movement between the tubes. For instance, locking ring 94 is threadably engaged at one end of the second most inner tube 84 for selectively allowing the most inner tube 82 to be moved out of tube 84 and then releasably secured in a predetermined extended position relative to tube 84. The tightening of the locking ring 94 on tube 84 causes the same to radially contract against tube 82 to thereby frictionally lock the two tubes 82 and 84 together. However, by loosening the locking ring 94, the pressure exerted by the outer tube 84 on the inner tube 82 can be released, thereby allowing relative movement therebetween. Axially extending and circumferentially spaced-apart slots (not shown) or the like can be provided at the ends of the tubes to allow the same to contract against the associated inner tubes. A similar locking arrangement is provided between each pair of adjacent tubes and thus a duplicate description thereof will be omitted. Other suitable expandable, collapsible or telescopic arrangement are contemplated could be used. Common anti-rotational mechanisms are also contemplated between concentric tubes 82, 84, 86, 87 and 88, as for example the tubes could have an oval shape in cross-section.

As seen in FIGS. 15 and 16, the golf ball retriever assembly 80 further comprises a ball retriever 110 which can be cylindrical in shape and of a diameter slightly larger than that of a standard gold ball. The ball retriever 110 is mounted at the distal end of the inner rod 82. Protrusions or teeth can be used inside the ball retriever 110 to maintain the ball in place once the user as recuperated the ball.

As shown in FIGS. 1, 15 and 16, the golf ball retriever end portion of the tool 10 may comprise soft grip rubber handle 112 surrounding the lower portion of the main tube 12 and around the handle 20 enabling the user to comfortably use the tool 10 when retrieving golf balls or raking sand. The handle 112 can be made for example of rubber and have ribs providing a better grip for the user. As shown in FIG. 15, a flexible or spring loaded hook formation 120 can be provided at the end of handle 112 for engagement with the ball retriever 110 in order to releasably retrain the telescoping tubes 82, 84, 86, 97 and 88 in their retracted position within the main tube 12. The resilient hook formation 120 can be easily disengaged from the ball retriever cup 110 by manually pulling thereon in a direction away from the ball retriever cup 110.

Figure 4:
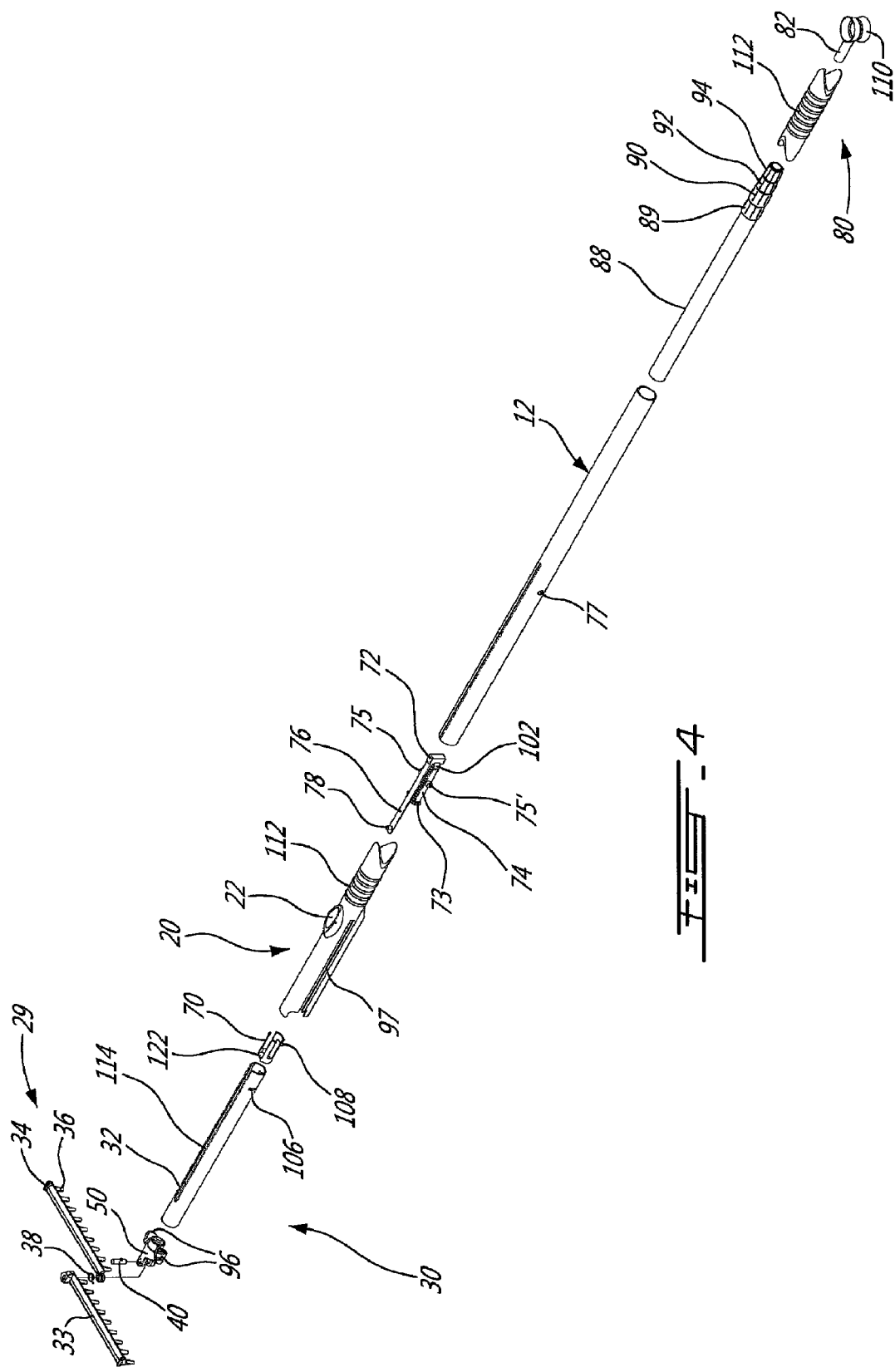
FIG. 4 is an exploded perspective view of the combined golf ball retriever and sand rake tool.
Figure 8:
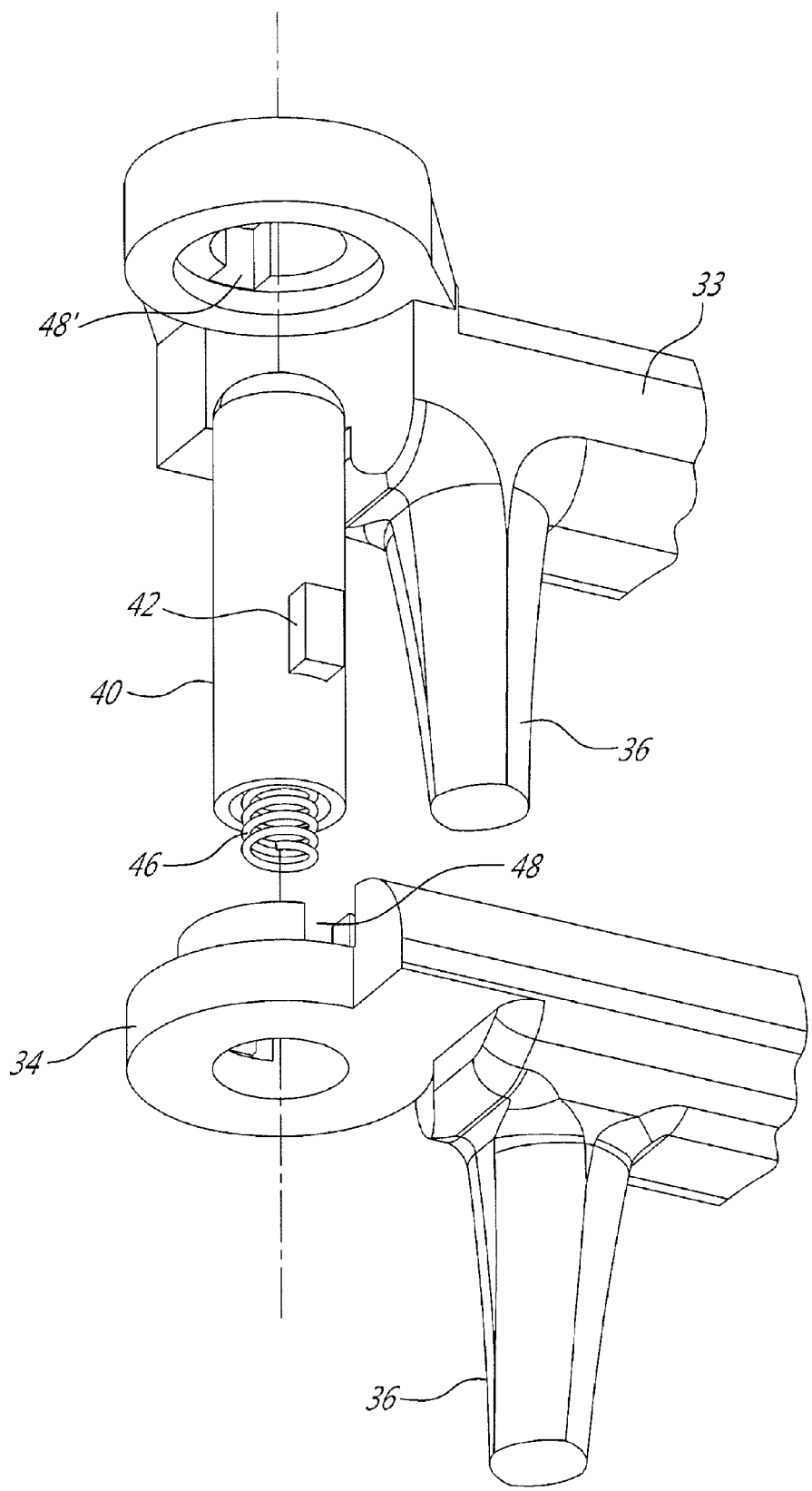
FIG. 8 is an enlarged side cross-section of the sand rake portion of the tool showing the arms of the rake received in a folded retracted position within the hollow control sleeve or handle of the tool.
Figure 7:
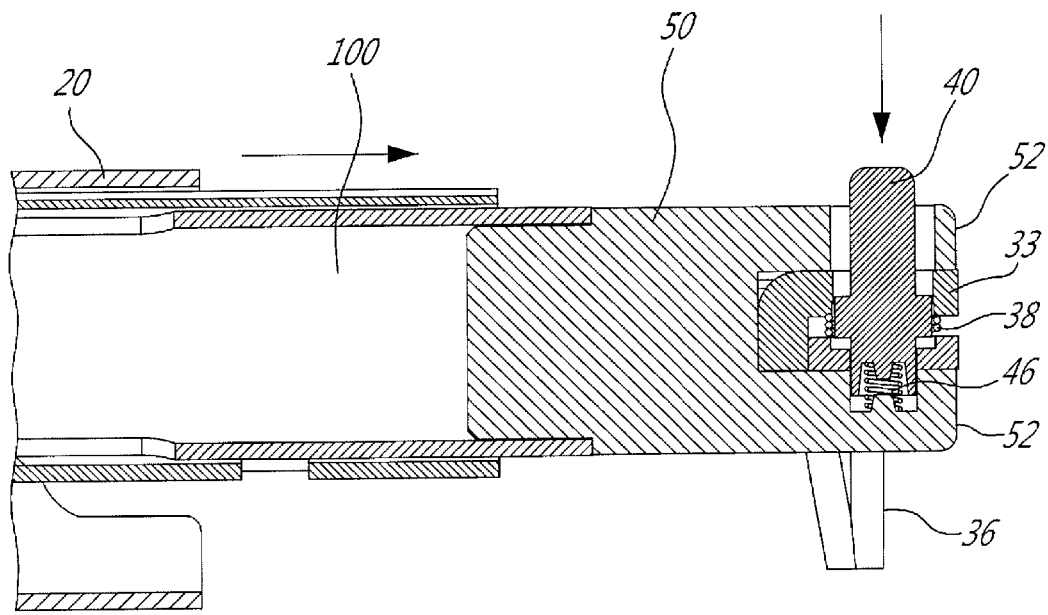
FIG. 7 is an enlarged side cross-section view of the sand rake portion of the tool in the process of being moved back in a storage or retracted position.
Figure 8:
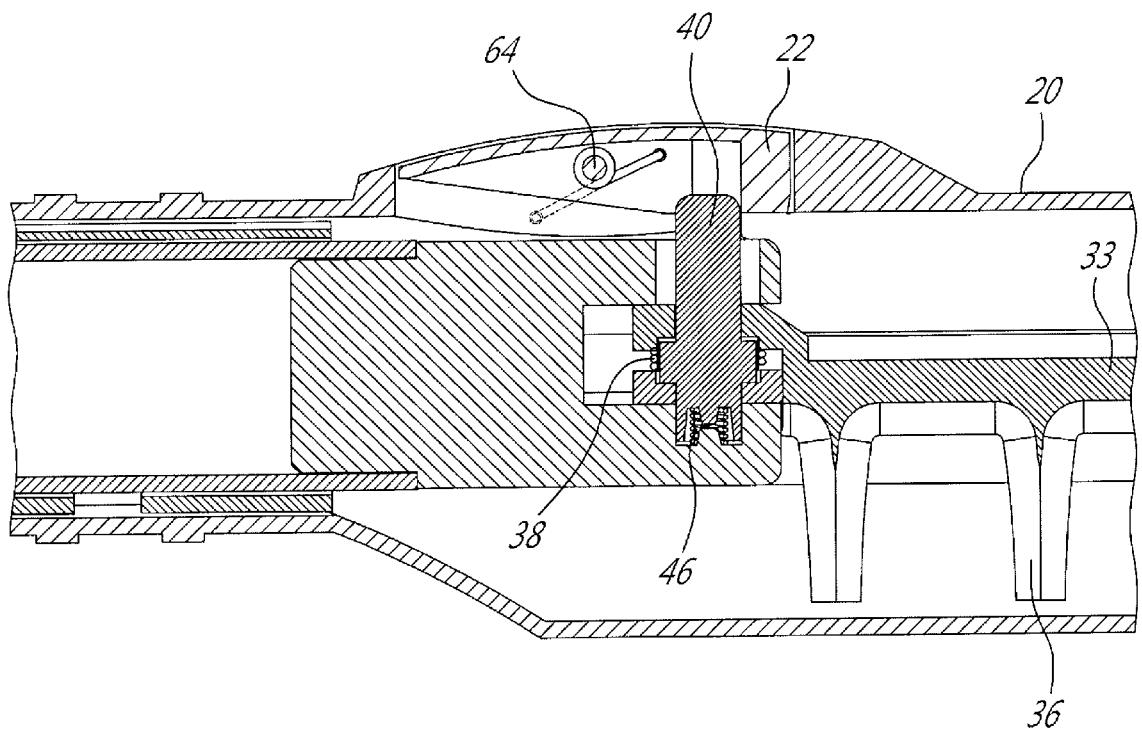

There will now be described in greater details one possible construction of the collapsible rake assembly 30 and of the control mechanism thereof. As shown in FIGS. 4 and 5, the foldable head portion 29 of rake assembly 30 comprises a head member 50 having a proximal end fixedly received in a tight fit manner in the outer distal end of the rake extension tube 32. The head member 50 has at its opposed distal end a pair of axially extending spaced-apart top and bottom fingers 52 adapted to receive therebetween the connecting ends of a pair of pivotal rake arms 33 and 34 provided with respective rows or downwardly projecting prongs 36. As shown in FIGS. 5, 7 and 8, an axially spring loaded axle 40 pivotally interconnects the arms 33 and 34 to the head member 50. A compression spring 46 received at a first end thereof in a seat defined in the top face of the bottom finger 52 of the head member 50 and at an opposed end thereof in a recessed seat defined in the lower end of the axle 40 bias the axle 40 upwardly towards a locking position (FIG. 7) in which the upper end of the axle 40 projects upwardly from the top face of the top finger 52 so as to be engageable by the undersurface of the control button 22 of the control handle 20 (see FIG. 8).

A pair of diametrically opposed locking projections or protrusions 42 are provided on the axle 40 for engagement with corresponding diametrically opposed locking grooves 48 and 48' defined in the connecting end portions of the foldable or pivotable rake arms 33 and 34. As can be appreciated from FIG. 5, the locking grooves 48 and 48' on both arms 33 and 34 are axially aligned with the locking projections 42 on the axle 40 when the arms 33 and 34 are in their expanded or deployed position such as to permit the engagement of the locking projections 42 in the grooves 48 and 48' under the action of compression spring 46 on the axle. When the locking projections 42 are engaged in grooves 48 and 48' the arms 33 and 34 are locked against relative pivotal movements. However, by depressing the axle downwardly against the compression spring 46, as for instance shown in FIG. 8, the locking projections 42 moves axially out the grooves 48 and 48', thereby unlocking the arms 33 and 34 and allowing the pivotal movement thereof towards their folded or collapsed position in which the arms are folded once against the other, as for instance, shown in FIG. 2a. A torsion spring 38 is provided to bias the arms 33 and 34 towards their open functional position. However, when the arms 33 and 34 and the rake extension tube 32 are in their retracted position (FIGS. 1 and 9), the engagement of the tubular control handle 20 over the arms 33 and 34 prevent the same from opening up. Also as shown in FIG. 8, the upper end of the axle 40 acts has a latch for latching engagement with the control button 22 to prevent sliding movement of the control handle 20 on the main tube 12. The lateral stoppers 96 can be provided on opposed sides of the head member 50 for sliding engagement in corresponding axially extending slots 97 (FIG. 1) defined in the control handle 20 in order to limit the sliding movement of the control handle and to further prevent the pivotal movement of the rake arms 33 and 34 beyond 180 degrees.

Figure 14:
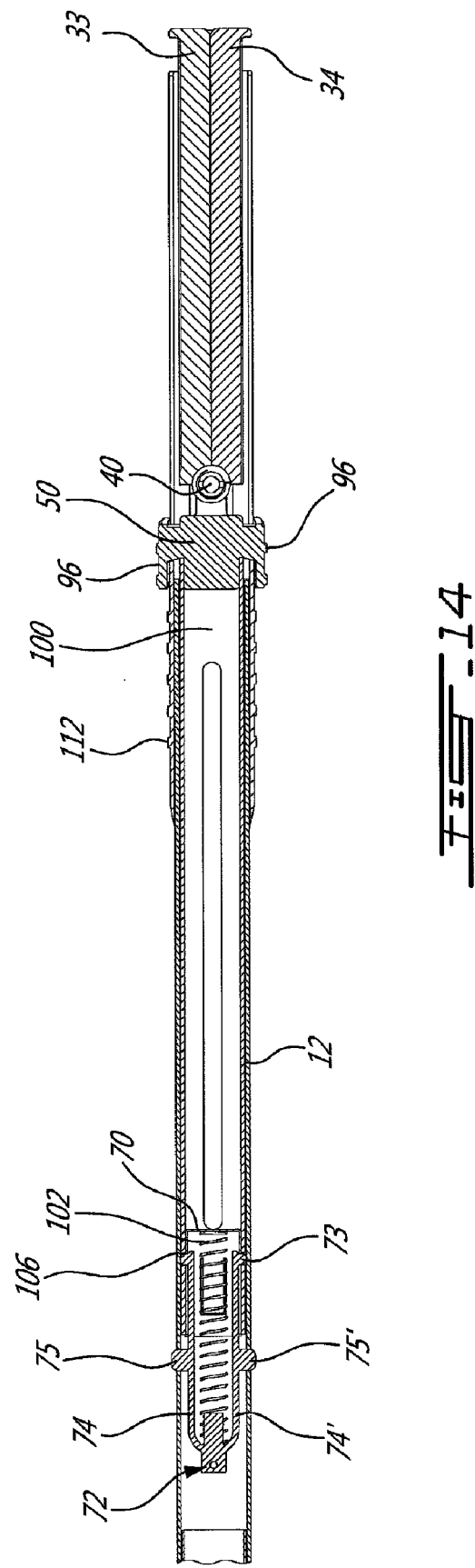
FIG. 14 is a top cross-section of the sand rake portion in its storage or retracted position.

Turning back to FIG. 4, it can be seen that a latching and launching mechanism is mounted inside the main tube 12 for selectively retaining the extension tube 32 in a retracted position within the main tube 12 and cause the same to be pushed out of the main tube 12 when it is desired to use the sand rake portion of the tool 10. It is contemplated any variations, functional equivalent or adaptations of the latching and launching mechanism. The mechanism comprises a bracket 72 having a pair of spring-loaded side arms 74, each arm having a pin 75 protruding outwardly from a corresponding hole 77 defined in the main tube 12. Each side arm 74 is provided at the distal end thereof with a locking finger 73 for engagement in a corresponding slot 106 defined in the rake extension tube 32 (see FIGS. 4 and 14). The bracket also comprises an elongated top arm 76 with a latching pin 78 projecting upwardly through an elongated slot defined in the top surface of the main tube 12 (see FIGS. 4, 9 and 10). As seen in FIG. 10, the latching pin 78 is adapted to cooperate with the control button 22 to releasably latch the control handle 20 in its retracted position on the main tube 12. In this retracted position, the control handle 20 pushes inwardly on the lateral pins 75, causing the side arms 74 to collapse inwardly and, thus, the retraction of fingers 73 from the complementary slots 106 in the rake extension tube 32 (see FIG. 11). Accordingly, in the position illustrated in FIG. 11, the rake extension tube 32 is unlatched from the main tube 12 and is thus free to be pushed out of the main tube 12 toward its extended operational position (FIG. 2c). Common anti-rotational mechanisms are also contemplated between the rake extension tube 32 and the main tube 12. For example, the rake extension tube 32 could have an oval shape in cross-section.

Alternatively, the a latching and launching mechanism can be any mechanism allowing deployment of rake arms 33 and

34, such as for example a device comprising double arms with a "U" shape, arms connected to the rake arms 33 and 34 facilitating the angular movement of the rake arms 33 and 34 connected by a pivotable axle.

Figure 11:
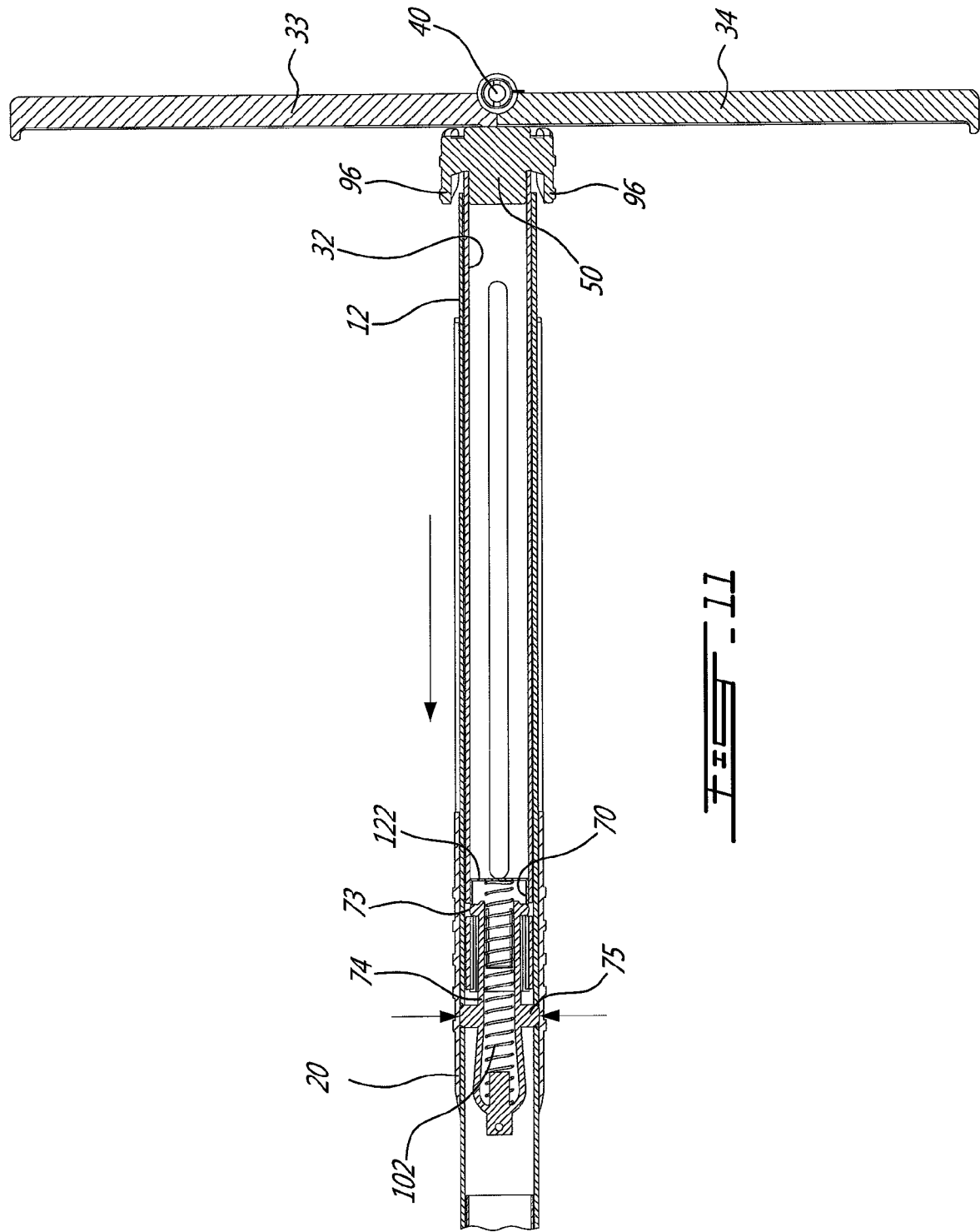
FIG. 11 is a top cross-section of the sand rake portion, illustrating how the hollow control handle causes the rake extension tube to be released from its retracted position in the main tube of the combined golf ball retriever and sank rake tool.

As best shown in FIGS. 4, 10 and 11, a compression spring 102 is attached at one end thereof to the bracket 72 of the latching and launching mechanism between side arms 74 to axially push on a bottom surface 122 of a slotted tubular cap 70 fixedly mounted in a tight fit manner in the proximal end of the rake extension tube 32. The spring 102 is operational due to its pushing action on the bottom surface 122 of cap 70 to propel the rake extension tube 32 out of the main tube 12 upon release of the locking fingers 73 from slots 106.

Figure 12:
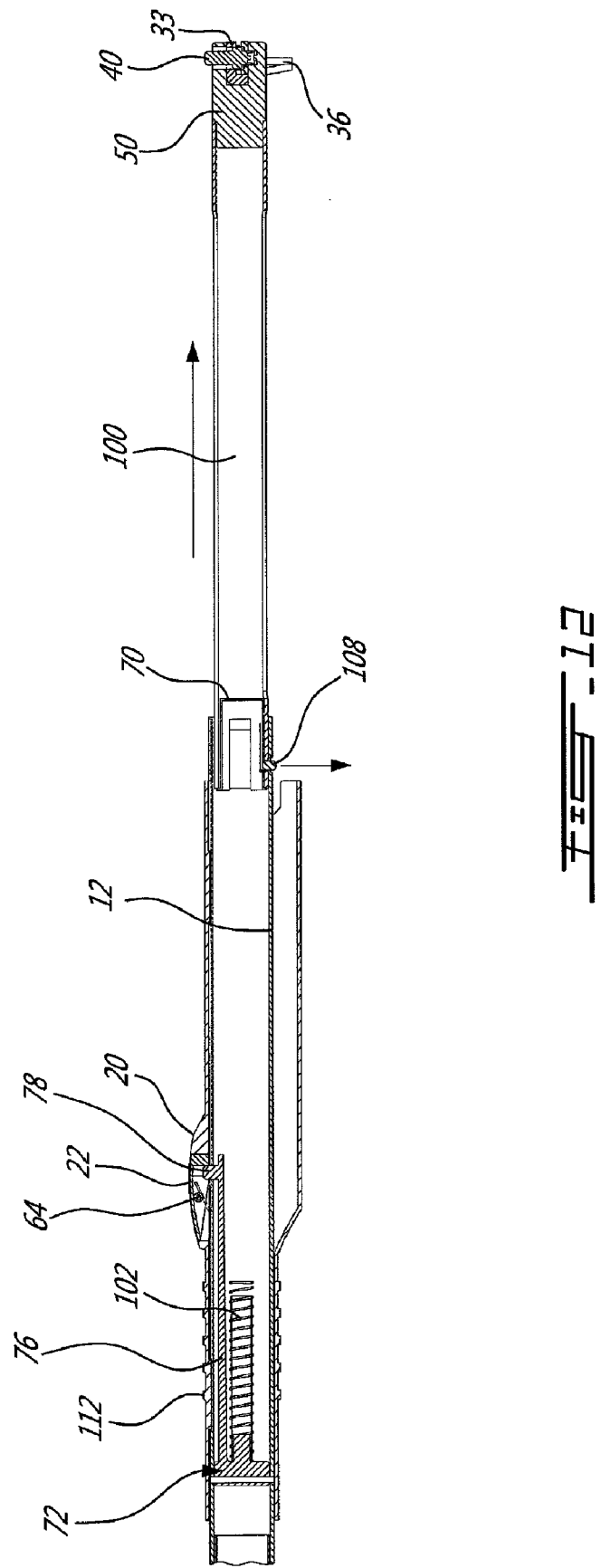
FIG. 12 is a side cross-section of the sand rake portion, illustrating the extension tube in a fully deployed or extended position with the spring-loaded locking finger of the extension tube received in a corresponding catch defined at one end of the main tube of the combined tool.
Figure 13:
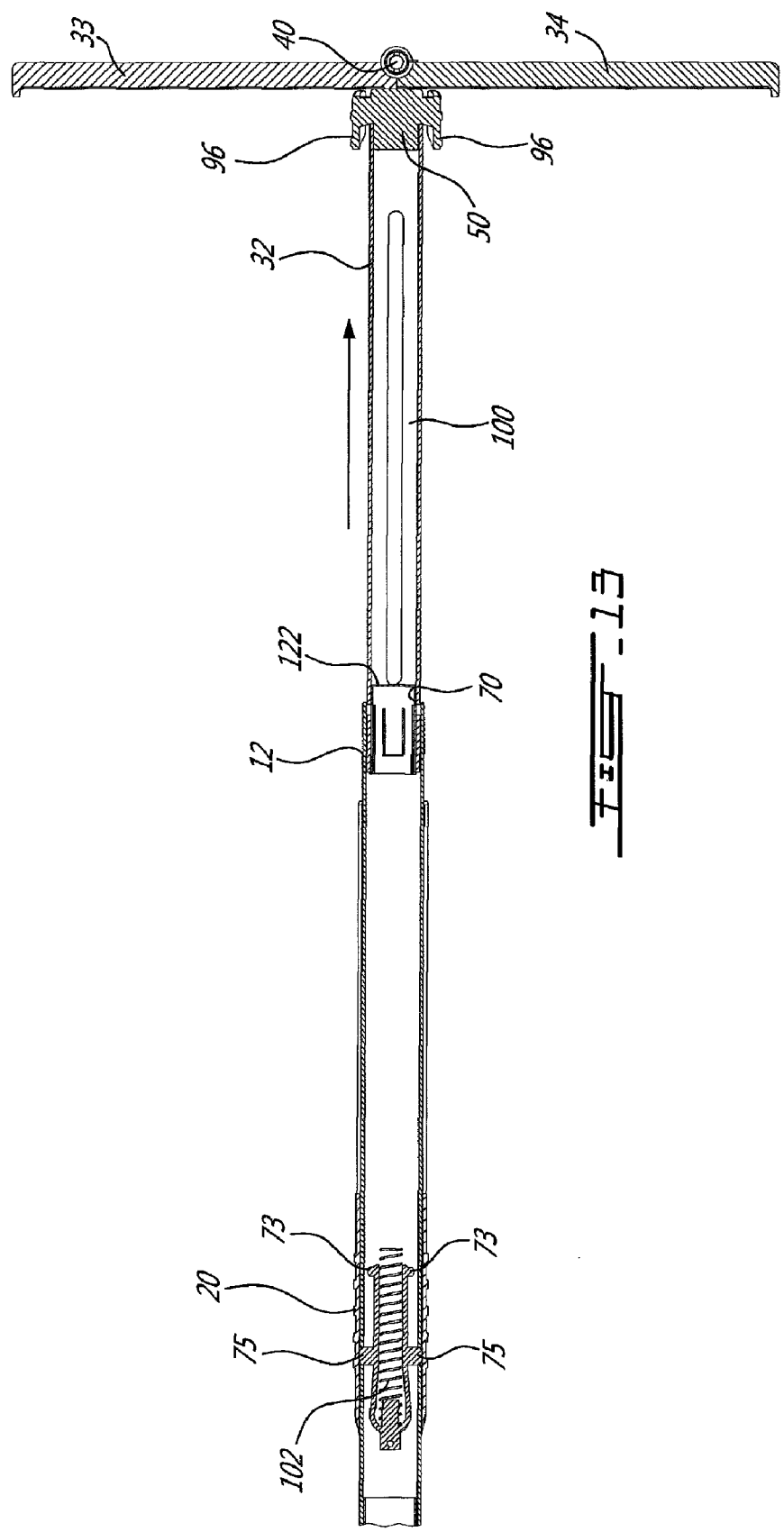
FIG. 13 is a top cross-section of the sand rake portion shown with the rake extension tube in its fully extended position.

As shown in FIGS. 10 and 12, a locking finger 108 is integrally formed on cap 70 and spring loaded against the inner diameter of the main tube 12 to automatically fall in a catch 109 defined at the rake end portion of the main tube 12 when the extension tube 32 reaches its extended position. The finger 108 and the catch 109 cooperate to prevent the extension tube 32 from being completely pushed out of the main tube 12 while at the same time providing a means to automatically lock the extension tube 32 in position relative to the main tube 12 once deployed (see FIGS. 12 and 13). The resiliency of the locking finger 108 causes the same to automatically fall into the catch 109 when the finger 108 encounters the catch 109.

As shown in FIGS. 2c, 4, and 16 the extension 100 can be provided with elongated longitudinal slots 114 for allowing sand or dirt particles to fall out of the combined golf ball retriever and retractable rake tool 10 and thus prevent any accumulation of particles that could impede with the proper operation of the tool.

In use, the combined golf ball retriever and sand rake tool 10 would normally be initially configured in its retracted or collapsed state (FIG. 1). In order to deploy the rake assembly 30, the user press with his/her thumb on the button 22 provided on the handle 20 (see the arrow in FIG. 9) to unlatch the handle 20 from the main tube 12 by depressing the axle 40 downwardly against the compression spring 46. The handle 20 can then slide on the main tube 12 towards the golf ball retriever assembly 80 (see arrow in FIG. 2a), exposing the foldable head portion 29 of the rake assembly 30. Following compression of the spring 46, the locking projections 42 of the axel 40 move axially out of the grooves 48 and 48' unlocking the arms 33 and 34 and allowing their pivotal movement in order to be deployed (FIG. 2b). The spring 46 is then free to push back up the axles 40 upwardly moving the locking projections 42 back into grooves 48 and 48', thereby locking the arms 33 and 34 in the deployed position. The handle portion 20 slides sufficiently towards the golf ball retriever assembly 80 in order for the control button 22 to engage the latching pin 78 (FIG. 10) of the latching and launching mechanism, pushing inwardly on the lateral pins 75, causing the side arms 74 to collapse inwardly, retracting the fingers 73 from the complementary slots 106 in the rake extension tube 32 (see FIG. 13). The rake extension tube 32 is then unlatched from the main tube 12 and is pushed out of the main tube 12 toward its extended operational position (FIG. 2c) by the spring 102, pushing on the bottom surface 122 of the slotted tubular cap 70. The finger 108 falls then into the catch 109 when the finger 108 encounters the catch 109 in the extension tube 32, locking the extension tube 32 in position relative to the main tube 12 in the deployed position (see FIGS. 12 and 13).

In order to retract the rake assembly 30, the user must first push the locking finger 108 inwardly out of the catch 109, thereby allowing the extension tube 32 to be manually pushed back into the main tube 12. The next step is to press on the control button 22, to unlatch the control handle 20 from locking pin 78. Consequently, the handle 20 will then be free to slide toward the rake assembly 30. At some point during the movement of the control handle 20 toward the rake assembly, the handle 20 will clear the lateral pins 75 thereby allowing the fingers to spring back into slots 106 of the retracted extension tube 32 in order to releasably retain the extension tube 32 in its retracted position within the main tube 12. When the handle 20 reaches the rake assembly 30, the spring-loaded pivot axle 40 is be pushed downwardly by the handle 20 against the biasing force of spring 46, thereby unlocking the rake arms 33 and 34 and allowing the rotation thereof towards each other through the pushing action of the tubular wall of the handle 20. The axle 40 will reengage the button 22 once the rake arms 32 and 34 have collapsed on each other in the retracted position and fixing the handle 20 in place (FIGS. 8 and 9).

The disclosed combined golf ball retriever and retractable rake, when retracted, can be carried by the golf player in his bag, and thus eliminating the needs of golf course operation's to provide that sufficient number of rakes is available around the bunkers since each golfer can now carry is on rake. Preferably, the disclosed combined golf ball retriever and retractable rake, when retracted, is 50 inches long so that it is sufficiently compact to be carried in a gold bag. In addition, by carrying the disclosed combined golf ball retriever and retractable rake in the golf bag, an unwanted obstacle normally found in golf courses today is eliminated and thus, there is no longer a risk of a golf ball hitting rakes lying around bunkers during play.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A combined golf ball retriever and retractable rake tool comprising:
   a tubular body having a first end and a second end;
   a rake assembly comprising a pair of pivotally interconnected rake arms pivotable between a retracted position in which the rake arms are folded once against the other and at least partly concealed inside the first end of the tubular body, and an extended position in which the first and second arms are disposed in general linear alignment outside of said first end; and
   a ball retriever assembly having at least one telescoping member displaceable from a retracted position in which the at least one telescoping member is at least partly retracted in said second end of the tubular body, and an extended position in which said telescoping member project outwardly from said second end of the tubular body;
   wherein the at least one telescoping member comprises at least one concentric tube concentrically mounted to the tubular body with at least one locking ring selectively locking the concentric tube in position relative to the tubular body when tightened.

2. The tool of claim 1, wherein said tubular body comprises a main tube and a tubular control handle axially slideable between operational positions along said main tube for retracting and deploying the rake assembly.

3. The tool of claim 2, wherein said tubular control handle is movable from a first position in which the tubular control handle extends at least partly over the rake arms when the rake arms assume the retracted position thereof to a second position in which the rake arms are exposed.

4. The tool of claim 3, wherein said pair of rake arms are pivotally interconnected by a spring-loaded axle having a locking protrusion for engagement with corresponding abutment structure on the rake arms, and wherein the control handle in its first position pushes the spring-loaded axle against a biasing force thereof, thereby holding the locking protrusion in an inoperable position to permit deployment of the rake arms.

5. The tool of claim 3, wherein said rake assembly comprises an extension tube retractable in the tubular body, the rake arms being mounted at a distal end portion of said extension tube, said extension tube being displaced to an extended position when the control handle assumes its second position.

6. The tool of claim 4, wherein the rake assembly further comprises a head member connected at a proximal end to an extension tube, said head member having at an opposed distal end thereof a pair of axially extending spaced-apart fingers adapted to receive therebetween the spring-loaded axle.

7. The tool of claim 5, further comprising a launching mechanism housed in said main tube, said control handle triggering said launching mechanism when displaced to said second position thereof to cause said extension tube to extend from said first end of said main tube.

8. The tool of claim 7, wherein the launching mechanism comprises a bracket comprising:
a pair of spring-loaded arms being releasably connected to the main tube, each spring-loaded arms comprising a locking finger for engagement in a corresponding slot in the extension tube; and
an elongated arm with a latching pin projecting through an elongated slot defined in the surface of the main tube, the latching pin releasably latching the control handle in the retracted position.

9. The tool of claim 1, further comprising a cap fixedly mounted on a proximal end of an extension tube, the cap comprising a locking finger spring loaded against the main tube and falling in a catch defined at the main tube when the extension tube reaches its extended position.

10. The tool of claim 5, wherein said extension tube comprises at least one elongated longitudinal slot allowing dust particles to fall out of the tool.

11. The tool of claim 1, wherein the tubular body comprises a handle at the second end of the tubular body, said handle having a hook for engaging the ball retriever when in the retracted position.

12. A combined golf ball retriever and retractable rake comprising:
a main tube having a first end and a second end;
a rake assembly provided at said first end of the tubular body, the rake assembly comprising two rake arms pivotally connected to a distal end portion of an extension tube at least partly retractable inside said main tube, the rake arms being pivotable from a collapsed position to an extended position;
a ball retriever assembly provided at said second end of said tubular body, the ball retriever having at least one telescoping rod retractable in the second end of the tubular body and axially extendable therefrom;
a control handle axially slidable on said main tube, said control handle when displaced to a first position enabling the rake assembly to unfold from the collapsed position to the extended position by uncovering the rake assembly; and
a launching mechanism housed in said main tube, said control handle triggering said launching mechanism when displaced from a second position to the first position thereof causing said extension tube to extend from said first end of said main tube.

13. The rake of claim 12, wherein said rake arms are pivotally interconnected by a spring-loaded axle having a locking protrusion for engagement with corresponding abutment structure on the rake arms, and wherein the control handle in its first position pushes the spring-loaded axle against a biasing force thereof, thereby holding the locking protrusion in an inoperable position to permit deployment of the rake arms.

14. The rake of claim 13, wherein said extension tube is automatically displaced to an extended position by moving the control handle to the second position.

15. The rake of claim 13, wherein the rake assembly further comprises a head member connected at a proximal end to the extension tube, said head member having at its opposed distal end a pair of axially extending spaced-apart fingers adapted to receive therebetween the spring-loaded axle.

16. The rake of claim 12, wherein the launching mechanism comprises a bracket comprising:
a pair of spring-loaded arms being releasably connected to the main tube, each spring-loaded side comprising a locking finger for engagement in a corresponding slot in the extension tube; and
an elongated arm with a latching pin projecting through an elongated slot defined in the surface of the main tube, the latching pin releasably latching the control handle in the first position.

17. The rake of claim 12, further comprising a cap fixedly mounted on the proximal end to the extension tube, the cap comprising a locking finger spring loaded against the main tube and falling in a catch defined at the main tube when the extension tube reaches its extended position.

18. The rake of claim 12, wherein said extension tube comprises at least one elongated longitudinal slot allowing dust particles to fall out of the tool.

* * * * *